United States Patent
Wang

(10) Patent No.: US 11,404,688 B2
(45) Date of Patent: Aug. 2, 2022

(54) SECONDARY BATTERY AND APPARATUS CONTAINING THE SAME

(71) Applicant: CONTEMPORARY AMPEREX TECHNOLOGY CO., LIMITED, Ningde (CN)

(72) Inventor: Guangjun Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/564,677

(22) Filed: Dec. 29, 2021

(65) Prior Publication Data
US 2022/0123283 A1 Apr. 21, 2022

Related U.S. Application Data

(63) Continuation of application No. PCT/CN2020/128549, filed on Nov. 13, 2020.

(30) Foreign Application Priority Data

Nov. 25, 2019 (CN) .......................... 201911166945.X

(51) Int. Cl.
| | |
|---|---|
| H01M 4/36 | (2006.01) |
| H01M 4/505 | (2010.01) |
| H01M 4/525 | (2010.01) |
| H01M 4/133 | (2010.01) |
| H01M 4/134 | (2010.01) |
| H01M 4/38 | (2006.01) |
| H01M 4/587 | (2010.01) |
| H01M 50/133 | (2021.01) |
| H01M 10/0525 | (2010.01) |
| H01M 4/02 | (2006.01) |

(52) U.S. Cl.
CPC ........... *H01M 4/364* (2013.01); *H01M 4/133* (2013.01); *H01M 4/134* (2013.01); *H01M 4/386* (2013.01); *H01M 4/505* (2013.01); *H01M 4/525* (2013.01); *H01M 4/587* (2013.01); *H01M 10/0525* (2013.01); *H01M 50/133* (2021.01); *H01M 2004/021* (2013.01); *H01M 2004/027* (2013.01); *H01M 2004/028* (2013.01); *H01M 2220/20* (2013.01)

(58) Field of Classification Search
CPC ...... H01M 4/364; H01M 4/505; H01M 4/525; H01M 4/133; H01M 4/134; H01M 4/386; H01M 4/587; H01M 10/0525; H01M 50/133; H01M 2004/027; H01M 2004/021; H01M 2004/028; H01M 2220/20

See application file for complete search history.

(56) References Cited

U.S. PATENT DOCUMENTS

| | | | |
|---|---|---|---|
| 8,007,937 | B2 | 8/2011 | Hatta et al. |
| 10,199,613 | B2 | 2/2019 | Hashimoto et al. |
| 2007/0128513 | A1 | 6/2007 | Hatta et al. |
| 2016/0240823 | A1 | 8/2016 | Miyake |
| 2017/0149025 | A1 | 5/2017 | Hashimoto et al. |

FOREIGN PATENT DOCUMENTS

| | | |
|---|---|---|
| CN | 101197431 A | 6/2008 |
| CN | 101369674 A | 2/2009 |
| CN | 104466261 A | 3/2015 |
| CN | 105406086 A | 3/2016 |
| CN | 106784998 A | 5/2017 |
| CN | 108390092 A | 8/2018 |
| JP | 2000133220 A | 5/2000 |
| JP | 2016122569 A | 7/2016 |

OTHER PUBLICATIONS

International Search Report and Written Opinion dated Feb. 10, 2021 received in International Application No. PCT/CN2020/128549 together with an English language translation.

*Primary Examiner* — Carlos Barcena
(74) *Attorney, Agent, or Firm* — Scully Scott Murphy & Presser

(57) ABSTRACT

The present application provide a secondary battery and an apparatus containing the secondary battery. The secondary battery includes an outer packaging film, an electrode assembly and an electrolyte accommodated, the electrode assembly includes a positive electrode plate, a negative electrode plate and a separator, the positive electrode plate includes a positive electrode current collector and a positive electrode membrane arranged on at least one surface of the positive electrode current collector and including a positive electrode active material, the negative electrode plate includes a negative electrode current collector and a negative electrode membrane arranged on at least one surface of the negative electrode current collector and comprising a negative electrode active material, the positive electrode active material includes a lithium-contained nickel cobalt manganese oxide and/or a lithium-contained nickel cobalt aluminum oxide, the negative electrode active material includes a silicon-based material and a carbon material; the secondary battery satisfies: $-4 \leq 2*\sqrt{C}*C_{si}*C_{si}+0.1-L-F \leq 2$.

17 Claims, 2 Drawing Sheets

SECONDARY BATTERY AND APPARATUS CONTAINING THE SAME

CROSS-REFERENCES TO RELATED APPLICATIONS

The present application is a continuation of International Application No. PCT/CN2020/128549, filed on Nov. 13, 2020, which claims priority to Chinese Patent Application 201911166945.X, filed on Nov. 25, 2019 and entitled "SECONDARY BATTERY AND APPARATUS CONTAINING THE SAME", the entire content of which is incorporated herein by reference in its entirety.

TECHNICAL FIELD

Embodiments of the present application relate to the field of batteries, and in particular, to a secondary battery and an apparatus containing the secondary battery.

BACKGROUND

As a new type of high-voltage, high-energy density rechargeable battery, a secondary battery has outstanding features such as light weight, high energy density, no pollution, no memory effect, and long service life. It is a major trend in the development of new energy batteries. The negative material of the current commercial lithium-ion batteries is mainly graphite whose actual capacity has been close to the limit of its theoretical capacity (372 mAh/g), which cannot meet the demand for a higher energy density. The theoretical specific capacity of silicon material may reach 4200 mAh/g. Besides, the silicon has abundant reserves and wide sources, and thus attracts much attention of the industry.

However, silicon-based materials are prone to severe volume expansion and contraction during the battery cycling. The above volume expansion and contraction process is accompanied by destruction and repair of the solid electrolyte interphase (SEI) film, which increases the side reactions of the battery and leads to an increase in gas production. When the secondary battery uses a soft package for an outer package, the above problems appear to be particularly prominent, and there is a greater safety hazard.

In view of this, it is indeed necessary to provide a secondary battery that may solve the above-mentioned problems.

SUMMARY

In view of the problem in the background, the first aspect of an embodiment of the present application provides a secondary battery. On the premise of having a high energy density, the secondary battery may take good safety performances into account at the same time.

To achieve the above application purpose, the secondary battery provided in the first aspect of the embodiment of the present application comprises an outer packaging film and an electrode assembly and an electrolyte accommodated in the outer packaging film. The electrode assembly comprises a positive electrode plate, a negative electrode plate and a separator. The positive electrode plate comprises a positive electrode current collector and a positive electrode membrane arranged on at least one surface of the positive electrode current collector and comprising a positive electrode active material. The negative electrode plate comprises a negative electrode current collector and a negative electrode membrane arranged on at least one surface of the negative electrode current collector and comprising a negative electrode active material. The positive electrode active material comprises at least one of a lithium-contained nickel cobalt manganese oxide or a lithium-contained nickel cobalt aluminum oxide, and the negative electrode active material comprises a silicon-based material and a carbon material; and the secondary battery satisfies: $-4 \leq 2*\sqrt{C}*C_{si}*C_{si}+0.1L-F \leq 2$, $C \geq 15$ Ah, 25 cm $\leq L \leq$ 35 cm, 3 N/mm $\leq F \leq$ 9 N/mm; where:

C—a rated capacity of the secondary battery, in Ah;

$C_{si}$—a mass proportion of the silicon-based material in the negative electrode active material;

L—a projection length of the outer packaging film, in cm; and

F—a packaging strength of a packaging area of the outer packaging film, in N/mm.

The second aspect of the present application provides an apparatus comprising the secondary battery according to the first aspect of the present application.

The embodiment of the present application has at least the following beneficial effects:

Through a lot of researches, the inventor of the present application has discovered that when the negative electrode active material comprises a silicon-based material and a carbon material, the secondary battery can have good safety performances on the premise of having a high energy density under condition that the rated capacity of the battery and the mass proportion of the silicon-based material in the negative electrode active material, the length of the electrode assembly and the packaging strength of the outer packaging film are considered, while satisfying a specific relational expression: $-4 \leq 2*\sqrt{C}*C_{si}*C_{si}+0.1L-F \leq 2$ in the designing process of battery.

The apparatus of the present application comprises a secondary battery, and thus has at least the same advantages as the secondary battery.

BRIEF DESCRIPTION OF THE FIGURES

In order to illustrate the technical solution in the embodiments of the present application more clearly, brief description will be made below to the drawings required in the embodiments of the present application. Apparently, the drawings described below are some embodiments of the present application only, and other drawings could be obtained based on these drawings by those ordinary skilled in this field without creative efforts.

Figure 1:
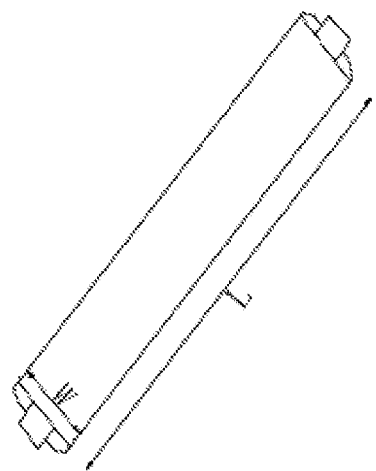
FIG. 1 is a schematic diagram of an embodiment of a soft package battery.

In the drawings, the drawings are not drawn to actual scale.

DETAILED DESCRIPTION

Embodiments of the present application will be further described below in detail with reference to the drawings and embodiments. The detailed description of the following embodiments and the accompanying drawings are used to exemplarily illustrate principles of the present application, but cannot be used to limit the scope of the present application, that is, the present application is not limited to the described embodiments.

In the description of the present application, it should be noted that unless otherwise stated, the meaning of "a plurality of" is more than two, orientations or positional relationships indicated by terms such as "up", "down", "left", "right", "inside" and "outside" are merely for convenience of describing the present application and for simplifying the description, but not for indicating or implying that an indicated apparatus or element must have a specific orientation and/or must be constructed and operated in a specific orientation, which thus may not be understood as limiting the present application. In addition, the terms "first", "second" and "third" are only intended for a purpose of description, and may not be understood as an indication or implication of relative importance. "Vertical" is not strictly vertical, but within the allowable range of error. "Parallel" is not strictly parallel, but within an allowable range of error.

The terms representing directions in the following description are all directions shown in the drawings, which is not for limiting the specific structure of the present application. In the description of the present application, it should be noted that unless otherwise explicitly specified and limited, the terms "mounting", "connecting" and "connection" should be understood in a broad sense, for example, they may be a fixed connection, a detachable connection, or an integrated connection; and may be a direct connection and may also be an indirect connection via an intermediate medium. Those of ordinary skill in the field may appreciate the specific meanings of the above terms in the present application according to specific conditions.

Figure 2:
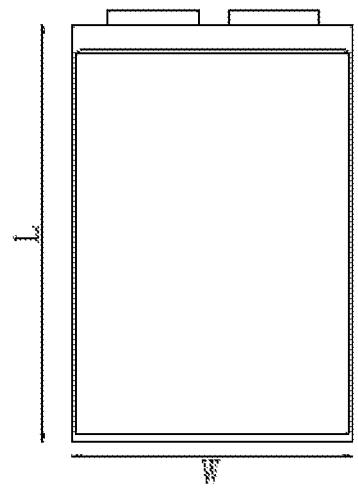
FIG. 2 is a schematic diagram of another embodiment of a soft package battery.

The first aspect of the present application provides a secondary battery, as shown in FIG. 1 and FIG. 2, comprising an outer packaging film and an electrode assembly and an electrolyte accommodated in the outer packaging film. The electrode assembly comprises a positive electrode plate, a negative electrode plate and a separator. The positive electrode plate comprises a positive electrode current collector and a positive electrode membrane arranged on at least one surface of the positive electrode current collector and comprising a positive electrode active material. The negative electrode plate comprises a negative electrode current collector and a negative electrode membrane arranged on at least one surface of the negative electrode current collector and comprising a negative electrode active material. The positive electrode active material selected from at least one or more of a lithium-contained nickel cobalt manganese oxide or a lithium-contained nickel cobalt aluminum oxide, and the negative electrode active material comprising a silicon-based material and a carbon material; and the secondary battery satisfies: $-4 \leq 2*\sqrt{C}*C_{si}*C_{si}+0.1L-F \leq 2$, $C \geq 15$ Ah, 25 cm$\leq L \leq$35 cm, 3 N/mm$\leq F \leq$9 N/mm;

where:

C—a rated capacity of the secondary battery, in ampere-hour (Ah);

$C_{si}$—a mass proportion of silicon-based material in negative electrode active material;

L—a projection length of the outer packaging film, in centimeter (cm); and

F—a packaging strength of a packaging area of the outer packaging film, in Newton per millimeter (N/mm).

When the negative electrode active material comprises the silicon-based material, the gas production of the battery during the cycle increases, which causes the electrode assembly to expand. In order to prevent outer packaging film of to the battery from damaging, it is necessary to continuously increase the packaging strength of the outer packaging film. However, under condition that the packaging strength is too large, when the battery is out of control, a large internal pressure will be accumulated inside the outer packaging film. When the internal pressure exceeds the packaging strength, the outer packaging film may burst and eject a large amount of high-temperature and high-pressure steam, which is extremely destructive. It is easy to cause heat spread around the battery, and may threaten the safety of users in severe cases. Therefore, it is necessary to consider a plurality of factors at the same time when designing the battery, such as a rated capacity of the battery, a mass percentage of the silicon-based material in the negative electrode active material, a size of the outer packaging film, the packaging strength, etc. These parameters have a certain correlation. Through a lot of researches, the inventor found that when the secondary battery satisfies the specific relational expression $-4 \leq 2*\sqrt{C}*C_{si}*C_{si}+0.1L-F \leq 2$, and $C \geq 15$ Ah, 25 cm$\leq L \leq$35 cm, 3 N/mm$\leq F \leq$9 N/mm, the battery may well balance the energy density and safety performance; and at the same time, it also greatly reduces the cycle of battery design.

In some embodiments of the present application, the value of $2*\sqrt{C}*C_{si}*C_{si}+0.1L-F$ may be −4, −3.5, −3, −2.6, −2, −1.7, −1.1, −0.8, −0.1, 0, 1, 1.2, 1.9, or 2, etc.

When $2*\sqrt{C}*C_{si}*C_{si}+0.1L-F$ is less than −4, it may be because the packaging strength is too large. When the battery is out of control, a large internal pressure will be accumulated inside the outer packaging film. When the internal pressure exceeds the packaging strength, the outer packaging film may burst and eject a large amount of high-temperature and high-pressure steam, which is extremely destructive. It is easy to cause heat spread around the battery, or directly threaten the safety of users.

When $2*\sqrt{C}*C_{si}*C_{si}+0.1L-F$ is greater than 2, it may be because the package strength is too small or a capacity per unit area of the electrode is too large. As a result, the battery is prone to electrolyte leakage and entering of air into the electrode assembly during the charging and discharging processes, causing the battery to fail and causing a potential safety hazard. In addition, it may be because the capacity per unit area of the electrode is too large or the silicon content is too large, which will increase the gas production of the battery during the cycle, thereby increasing the risk that the outer packaging film bursts.

In the secondary battery of the embodiment of the present application, the silicon-based material is selected from one or more of elemental silicon, a silicon-oxygen compound, a silicon-carbon composite, a silicon-nitrogen compound and a silicon alloy. In some embodiments, the silicon-based material is selected from the silicon-oxygen compound.

In the secondary battery of the embodiment of the present application, the carbon material is selected from one or more of graphite, soft carbon and hard carbon. In some embodiments, the carbon material is selected from the graphite, and the graphite is selected from one or more of artificial graphite and natural graphite.

In the secondary battery of the embodiment of the present application, in some embodiments, $-3.5 \leq 2*\sqrt{C}*C_{si}*C_{si}+0.1L-F \leq 0$. For example, the value of $2*\sqrt{C}*C_{si}*C_{si}+0.1L-F$ may be −3.5, −3.2, −2.5, −2, −1.6, −1.0, −0.7, −0.1, or 0, etc.

In the secondary battery of the embodiment of the present application, in some embodiments, the rated capacity C of the secondary battery satisfies 50 Ah$\leq C \leq$80 Ah. For example, the rated capacity C of the secondary battery may be 50 Ah, 52 Ah, 55 Ah, 60 Ah, 64 Ah, 68 Ah, 70 Ah, 72 Ah, 78 Ah, or 80 Ah, etc. Or, in some embodiments of the present application, the rated capacity C of the secondary battery may not be within the above range, and it may be greater than or equal to 15 Ah. For example, it may be 18 Ah, 30 Ah, 40 Ah, 90 Ah, or 100 Ah, etc.

Please refer to FIG. 1 and FIG. 2 again. In the secondary battery of the embodiment of the present application, 25 cm≤L≤35 cm. In some embodiments, the projection length L of the outer packaging film satisfies: 28 cm≤L≤32 cm. It should be noted that the projected length of the outer packaging film is a projected length parallel to an extension direction of a tab. In other words, the projection length L is the length of the projection in the direction parallel to the extension direction of the tab wherein the projection is a projection of the outer packaging film on a plane parallel to the tab. For example, the projection length L may be 25 cm, 28 cm, 28.6 cm, 29 cm, 29.3 cm, 29.7 cm, 30 cm, 30.8 cm, 31 cm, 32 cm or 35 cm, etc.

In the secondary battery of the embodiment of the present application, the packaging strength F of the packaging area of the outer packaging film satisfies: 3 N/mm≤F≤9 N/mm. In some embodiments, it may be 3 N/mm≤F≤8 N/mm. In the embodiment of the present application, the value of the packaging strength F may be 3 N/mm, 4 N/mm, 5 N/mm, 6 N/mm, 8 N/mm or 9 N/mm; by optimizing the packaging strength of the outer packaging film, it may not only ensure that the packaging area has a sufficiently large bonding force, and may also effectively prevent the bonding layer of the outer packaging film from being excessively melted during the pressing and bonding process, so as to ensure the structural integrity of the outer packaging film itself.

In the secondary battery of the embodiment of the present application, the mass proportion of the silicon-based material in the negative electrode active material satisfies $C_{is} \leq 40\%$. In some embodiments, $15\% \leq C_{is} \leq 30\%$. In the embodiment of the present application, the mass proportion Ci of the silicon-based material in the negative electrode active material is greater than zero and less than 40%. For example, it may be 0.1%, 1%, 5%, 10%, 15%, 19%, 23%, 28%, 30%, 38%, or 40%, etc. By optimizing the proportion of silicon-based material in the negative electrode active material, the energy density of the negative electrode active material may be improved, and the gas production of the battery during the cycle may also be controlled, so as to achieve the purpose of improving the energy density and reliability of the battery. In other embodiments of the present application, the mass proportion Ci of the silicon-based material in the negative electrode active material may also be greater than 40%. For example, it may be 45%, 50%, etc.

In the secondary battery of the embodiment of the present application, in some embodiments, the thickness T of the packaging area of the outer packaging film satisfies: 0.2 mm≤T≤0.4 mm, and in some embodiments it may be 0.25 mm≤T≤0.3 mm. For example, in the embodiment of the present application, the thickness T of the packaging area of the outer packaging film may be 0.2 mm, 0.22 mm, 0.25 mm, 0.3 mm, 0.35 mm, or 0.44 mm, etc. In this way, it may ensure that the two-layer outer packaging film is tightly encapsulated without causing damage to a protective layer inside the outer packaging film. It may be understood that, in other embodiments of the present application, the thickness T of the packaging area of the outer packaging film may not be within the above range. For example, it may be 0.15 mm, 0.5 mm, etc.

In the secondary battery of the embodiment of the present application, in some embodiments, the projected width W of the outer packaging film is 8.5 cm≤W≤11 cm, and in some embodiments, it may be 9 cm≤W≤10.5 cm. For example, the projection width W of the outer packaging film may be 8.5 cm, 9 cm, 9.6 cm, 10 cm, 10.5 cm, or 11 cm, etc. Among them, the projection width of the outer packaging film is a projection size perpendicular to the extension direction of the tab; and in other words, the projection width W of the outer packaging film is the length of the projection in the direction perpendicular to the extension direction of the tab wherein the projection is a projection of the outer packaging film on the plane parallel to the tab. When the projection width of the outer packaging film is controlled within the given range, a packaging space formed by the outer packaging film may be effectively used during packaging, thereby effectively improving the grouping efficiency of batteries in the module. In other embodiments of the present application, the projected width W of the outer packaging film may not be within the above range. For example, it may be 8 cm, or 12 cm, etc.

In the secondary battery of the embodiment of the present application, in some embodiments, the positive electrode active material is selected from $Li_aNi_bCo_cM_dM'_eO_fA_g$ or $Li_aNi_bCO_cM_dM'_eO_fA_g$ provided with a coating layer on at least a part of its surface; in other words, the positive electrode active material comprises $Li_aNi_bCo_cM_dM'_eO_fA_g$; or the positive electrode active material comprises $Li_aNi_b$-$Co_cM_dM'_eO_fA_g$ provided with a coating layer on at least part of its surface; or the positive electrode active material may comprise the above two materials configured in any proportion, where $0.8 \leq a \leq 1.2$, $0.5 \leq b < 1$, $0 < c < 1$, $0 < d < 1$, $0 \leq e \leq 0.1$, $1 \leq f \leq 2$, $0 \leq g \leq 1$, M is selected from one or more of Mn and Al, M' is selected from one or more of Zr, Al, Zn, Cu, Cr, Mg, Fe, V, Ti and B, and A is selected from one or more of N, F, S and Cl.

In the secondary battery of the embodiment of the present application, in some embodiments, at least a part of the positive electrode active material comprises a single crystal particle. When the positive electrode active material comprises the single crystal particle, the positive electrode active material of the single crystal particle may improve an overall compaction density and ductility of the positive electrode plate, while reducing the contact area between the positive electrode active material and the electrolyte, reducing the occurrence of side reactions of the interface, reducing gas production, and further improving the cycle performance of the secondary battery.

In the secondary battery of the embodiment of the present application, in some embodiments, a volume average particle diameter $D_{c50}$ of the positive electrode active material is from 8 micrometers (μm) to 12 micrometers (μm); and in some embodiments, it may be from 9 μm to 11 μm. For example, the volume average particle diameter $D_{c50}$ of the positive electrode active material may be 8 μm, 9 μm, 9.5 μm, 10 μm, 11 μm, or 12 μm, etc. Under condition that the particle of the positive electrode active material is too small, the specific surface area will increase correspondingly, the side reactions will increase accordingly, and the cycle stability of the battery will be relatively reduced. Under condition that the particle is too large, the dynamic performance of the positive electrode active material will deteriorate, and it is easy to break during charging and expansion, which will further affect the rate performance and cycle performance of the battery. Therefore, the battery may have better rate performance and cycle performance by optimizing the particle diameter of the positive electrode active material.

In the secondary battery of the embodiment of the present application, in some embodiments, a volume average particle diameter $D_{a50}$ of the negative electrode active material is from 11 μm to 18 μm; and in some embodiments, it may be from 13 μm to 16 μm. For example, the volume average particle diameter $D_{a50}$ of the negative electrode active material may be 11 μm, 12 μm, 13 μm, 14 μm, 15 μm, 16 μm, 17 μm, or 18 μm, etc. Under the condition that the particle of the negative electrode active material is too small, the specific surface area will increase correspondingly, the side reactions will increase accordingly, and the cycle stability of the battery will be relatively reduced. Under the condition that the particle is too large, the dynamic performance of the negative electrode active material will deteriorate, and it is easy to break during charging and expansion, which will further affect the rate performance and cycle performance of the battery. Therefore, the battery may have better rate performance and cycle performance by optimizing the particle diameter of the negative electrode active material.

In the secondary battery of the embodiment of the present application, a type of the positive electrode current collector is not particularly limited, and may be selected according to actual needs. For example, the positive electrode current collector may be an aluminum foil, a nickel foil or a polymer conductive film. In some embodiments, the positive electrode current collector is an aluminum foil.

In the secondary battery of the embodiment of the present application, a type of negative electrode current collector is not particularly limited, and may be selected according to actual needs. For example, the negative electrode current collector may be a copper foil, a carbon-coated copper foil or a polymer conductive film. In some embodiments, the negative electrode current collector is a copper foil.

In the secondary battery of the embodiment of the present application, the positive electrode film further comprises a conductive agent and a binder. A type and a content of the conductive agent and the binder are not particularly limited, and may be selected according to actual needs.

In the secondary battery of the embodiment of the present application, the negative electrode film further comprises a conductive agent and a binder. A type and a content of the conductive agent and the binder are not particularly limited, and may be selected according to actual needs.

In the secondary battery of the embodiment of the present application, a type of separator is not particularly limited, and it may be any separator material used in existing batteries, such as polyethylene, polypropylene, polyvinylidene fluoride, and a multilayer composite film thereof, and is not limited to these.

In the secondary battery of the embodiment of the present application, the electrolyte comprises an electrolyte salt and an organic solvent, where a particular type and composition of the electrolyte salt and the organic solvent are not limited to specific restrictions, and may be selected according to actual needs. In some embodiments, the electrolyte salt may be selected from one or more of lithium hexafluorophosphate, lithium tetrafluoroborate and lithium bisfluorosulfonimide. The organic solvent may comprise one or more of cyclic carbonates, linear carbonates and carboxylic acid esters. The electrolyte may also comprise functional additives. The functional additives may comprise, for example, vinylene carbonate, vinyl sulfate, propane sultone, fluoroethylene carbonate, etc.

In other embodiments, a method known in the field may be used to prepare the secondary battery of the embodiment of the present application. As an example, the positive electrode plate, the separator, and the negative electrode plate are wound (or laminated) in order, so that the separator is placed between the positive electrode plate and the negative electrode plate and performs the function of separation, to obtain an electrode assembly. The electrode assembly is placed in the outer packaging film, the electrolyte is injected and it is encapsulated with a packaging machine to obtain a secondary battery.

In the above method for preparing, a temperature and pressure of a packaging head of the packaging machine may be adjusted to regulate the packaging strength of the outer packaging film to make it within the given range.

In some embodiments, a material of the outer packaging of the secondary battery may be plastic, such as one or more of polypropylene PP, polybutylene terephthalate PBT, polybutylene succinate PBS, etc.

As an example, the battery module may comprise the secondary battery of the embodiment of the present application. The number of secondary batteries contained therein may be multiple, and the particular number may be regulated according to the application and capacity of the battery module.

As an example, a battery pack may comprise the above battery module. That is, the battery pack comprises the secondary battery of the embodiment of the present application. The number of battery modules contained in the battery pack may be multiple, and the particular number may be regulated according to the application and capacity of the battery pack.

The second aspect of the present application provides an apparatus. The apparatus comprises the secondary battery of the first aspect of the present application. The secondary battery may be used as a power source for the apparatus. Due to the use of the secondary battery provided by the present application, the apparatus of the present application may have relatively high safety performance.

The apparatus may be, but is not limited to, a mobile device (such as a mobile phone, a laptop, etc.), an electric vehicle (such as a pure electric vehicle, a hybrid electric vehicle, a plug-in hybrid electric vehicle, an electric bicycle, an electric scooter, an electric golf cart, an electric truck, etc.), an electric train, a ship and satellite, an energy storage system, etc.

Figure 3:
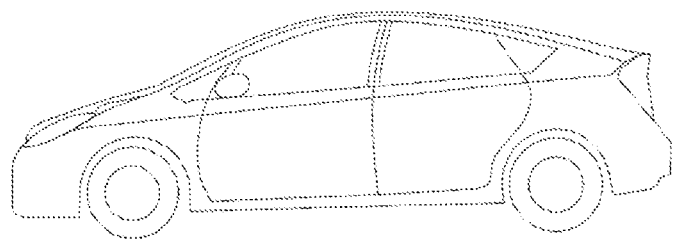
FIG. 3 is a schematic structural diagram of an embodiment of an apparatus.

For example, FIG. 3 illustrates an apparatus comprising the secondary battery of the embodiment of the present application. The apparatus is a pure electric vehicle, a hybrid electric vehicle, or a plug-in hybrid electric vehicle, etc. The secondary battery of the embodiment of the present application power the apparatus.

The present application will be further described in detail below in combination with embodiments and comparative examples. It should be understood that the following embodiments are for better explaining the present application, not for limiting the scope of the present application.

Embodiment 1

The present embodiment is a lithium ion secondary battery, and its particular method for preparing is as follows:

1) Preparing a Positive Electrode Plate

Mixing a positive electrode active material of $LiNi_{0.8}Co_{0.1}Mn_{0.1}O_2$ (NCM811), a conductive agent of Super P, a carbon nanotube (CNT), and a binder of polyvinylidene fluoride (PVDF) in a mass proportion of 97.5:0.9:0.5:1.1. Adding the above mixture to a solvent of N-methylpyrrolidone (NMP) and stirring evenly under the action of a vacuum mixer to obtain a positive electrode slurry. Coating the positive electrode slurry evenly on an aluminum foil as the positive electrode current collector and drying at 85° C. Obtaining a positive electrode plate after cold pressing, trimming, cutting, and slitting.

2) Preparing a Negative Electrode Plate

Mixing the negative electrode active material of a silicon oxide of and an artificial graphite at a mass proportion of 25:75, which is further mixed with a conductive agent of Super P, a thickener sodium of carboxymethyl cellulose (CMC), and a binder of styrene butadiene rubber emulsion (SBR) at a mass proportion of 96.2:0.8:1.2:1.8. Adding the above mixture to a solvent of deionized water and stirring evenly under the action of the vacuum mixer to obtain a negative electrode slurry. Coating the negative electrode slurry evenly on a copper foil of the negative electrode current collector and drying at 85° C. Obtaining a negative electrode plate after cold pressing, trimming, cutting, and slitting.

3) Preparing an Electrolyte

An organic solvent is a mixture of ethylene carbonate (EC), ethyl methyl carbonate (EMC) and diethyl carbonate (DEC), and the mass proportion of EC, EMC and DEC is 1:1:1. In an argon atmosphere glove box with a water content of <10 ppm, dissolving the fully dried electrolyte salt lithium hexafluorophosphate in the above organic solvent and mixing evenly to obtain an electrolyte. Among them, a concentration of the electrolyte salt is 1.2 mol/L.

4 Separator

A polyethylene film (PE) is used as the separator.

5) Preparing a Lithium Ion Battery

Laminating the positive electrode plate, the separator, and the negative electrode plate in order, so that the separator is between the positive and negative electrode plates for separation. Then winding it into a square electrode assembly and packing the electrode assembly into an aluminum-plastic film as the outer packaging foil. A thickness of the aluminum-plastic film is 0.153 mm. Then after being baked at 80° C. to remove water, the electrolyte is injected and packaged. The package thickness in the packaging area of the outer package film is controlled to be 0.265 mm, and the package strength to be 8.1 N/mm. After standing, forming, folding, capacity testing and other processes, a lithium ion secondary battery is obtained. The projection length L of the battery outer packaging film is 30.8 cm, and the projection width W of the battery is 10 cm.

Embodiments 2-22 and Comparative Examples 1-4

For the secondary batteries of Embodiment 2-22 and comparative Examples 1-4, the method for preparing is similar to that of Embodiment 1, and the differences are listed in Table 1 respectively. Among them, the evaluation formula in Table 1 represents $2*\sqrt{C}*C_{si}*C_{si}+0.1 \cdot L-F$.

TABLE 1

| Sequence number | C (Ah) | $C_{si}$ (%) | L (cm) | F (N/mm) | T (mm) | W (cm) | Evaluation formula |
|---|---|---|---|---|---|---|---|
| Embodiment 1 | 65 | 25 | 30.8 | 8.1 | 0.265 | 10 | −4 |
| Embodiment 2 | 65 | 25 | 30.8 | 7.6 | 0.265 | 10 | −3.5 |
| Embodiment 3 | 65 | 25 | 30.8 | 7.2 | 0.265 | 10 | −3 |
| Embodiment 4 | 65 | 25 | 30.8 | 6.6 | 0.265 | 10 | −2.5 |
| Embodiment 5 | 65 | 25 | 30.8 | 6.1 | 0.265 | 10 | −2 |
| Embodiment 6 | 65 | 25 | 30.8 | 5.6 | 0.265 | 10 | −1.5 |
| Embodiment 7 | 65 | 25 | 30.8 | 5.0 | 0.265 | 10 | −1 |
| Embodiment 8 | 65 | 25 | 30.8 | 4.0 | 0.265 | 10 | 0 |
| Embodiment 9 | 65 | 25 | 30.8 | 3.0 | 0.265 | 10 | 1 |
| Embodiment 10 | 65 | 25 | 30.8 | 2.5 | 0.265 | 10 | 1.5 |
| Embodiment 11 | 65 | 25 | 30.8 | 2.0 | 0.265 | 10 | 2 |
| Embodiment 12 | 58 | 15 | 30.8 | 5.0 | 0.265 | 10 | −1.58 |
| Embodiment 13 | 68 | 30 | 30.8 | 5.0 | 0.265 | 10 | −0.44 |
| Embodiment 14 | 75 | 40 | 30.8 | 5.0 | 0.265 | 10 | 0.85 |
| Embodiment 15 | 65 | 25 | 25 | 5.0 | 0.265 | 9 | −1.49 |
| Embodiment 16 | 65 | 25 | 28 | 5.0 | 0.265 | 9.5 | −1.19 |
| Embodiment 17 | 65 | 25 | 32 | 5.0 | 0.265 | 10 | −0.79 |
| Embodiment 18 | 65 | 25 | 35 | 5.0 | 0.265 | 10.5 | −0.49 |
| Embodiment 19 | 65 | 25 | 30.8 | 5.0 | 0.2 | 10 | −0.91 |
| Embodiment 20 | 65 | 25 | 30.8 | 5.0 | 0.25 | 10 | −0.91 |
| Embodiment 21 | 65 | 25 | 30.8 | 5.0 | 0.3 | 10 | −0.91 |
| Embodiment 22 | 65 | 25 | 30.8 | 5.0 | 0.4 | 10 | −0.91 |
| Comparative example 1 | 65 | 25 | 30.8 | 10.0 | 0.265 | 10 | −6 |
| Comparative example 2 | 65 | 25 | 30.8 | 1.0 | 0.265 | 10 | 3 |
| Comparative example 3 | 65 | 25 | 40 | 0.1 | 0.265 | 10 | 4.91 |
| Comparative example 4 | 65 | 25 | 60 | 0.2 | 0.265 | 10 | 6.81 |

I. Product Parameter Test

1. The test process of a rated capacity C of a battery is as follows:

Firstly, charging to 4.25V at ⅓ C followed by charging at a constant voltage of 4.25V until the current is reduced to 0.05C;

Then, discharging to 2.5V at ⅓ C, and the discharged capacity at this time is the rated capacity of the battery.

2. The test method of the packaging strength F of the packaging area is as follows:

A long strip of 8 mm×20 mm is cut from the packaging area of the outer packaging film corresponding to each embodiment and the comparative example, and then a tensile test machine is used to perform a tensile test at an angle of 180°, and the tensile value is recorded.

3. The projection length of the outer packaging film, the projection width of the outer packaging film, and the packaging thickness of the packaging area The projection length and the projection width of the outer packaging film are measured with a square to test the size of the projection shadow, and then are directly measured with a ruler.

The package thickness may be tested with a micrometer or a tenthousandth micrometer.

II. Battery Performance Test

Battery Leakage Test

In each example and comparative example, 10 sets of samples are taken, which are charged to 4.25V at 113 C and checked every 5 days for a total of 20 times. The appearance of the battery is checked to determine whether there is leakage, and count the proportion of the number of leaky batteries. The statistical results are listed in Table 2.

TABLE 2

| Sequence number | Proportion of the number of leaky batteries |
|---|---|
| Embodiment 1 | 0/10 |
| Embodiment 2 | 0/10 |
| Embodiment 3 | 0/10 |
| Embodiment 4 | 0/10 |
| Embodiment 5 | 0/10 |
| Embodiment 6 | 0/10 |
| Embodiment 7 | 0/10 |
| Embodiment 8 | 0/10 |
| Embodiment 9 | 0/10 |
| Embodiment 10 | 0/10 |
| Embodiment 11 | 0/10 |
| Embodiment 12 | 0/10 |
| Embodiment 13 | 0/10 |
| Embodiment 14 | 0/10 |
| Embodiment 15 | 0/10 |
| Embodiment 16 | 0/10 |
| Embodiment 17 | 0/10 |
| Embodiment 18 | 0/10 |
| Embodiment 19 | 0/10 |
| Embodiment 20 | 0/10 |
| Embodiment 21 | 0/10 |
| Embodiment 22 | 0/10 |
| Comparative example 1 | 1/10 |
| Comparative example 2 | 1/10 |
| Comparative example 3 | 3/10 |
| Comparative example 4 | 4/10 |

It may be seen from the data in Table 2 that the secondary battery that meets the requirements of the present application does not have any leakage after charging. With respect to the secondary battery provided by Comparative examples 1-4, due to $2*\sqrt{C}*C_{si}*C_{si}+0.1$ L-F exceeds the scope of requirements defined in the present application, there are different degrees of liquid leakage.

The foregoing descriptions are only preferred embodiments of the present application, and are not intended to limit the present application. For those skilled in the field, the present application may have various modifications and changes. Any modification, equivalent substitution, improvement, etc, made within the spirit and principle of the present application can fall within the protection scope of the present application.

Although the present application is already described with reference to the preferred embodiments, various improvements may be made to the present application and the components therein may be replaced with equivalents without departing from the scope of the present application. In particular, as long as there is no structural conflict, various technical features mentioned in the various embodiments may be combined in any manner. The present application is not limited to the specific embodiments disclosed herein, and includes all technical solutions falling within the scope of the claims.

What is claimed is:

1. A secondary battery, comprising an outer packaging film and an electrode assembly and an electrolyte accommodated in the outer packaging film, the electrode assembly comprising a positive electrode plate, a negative electrode plate and a separator, the positive electrode plate comprising a positive electrode current collector and a positive electrode membrane arranged on at least one surface of the positive electrode current collector and comprising a positive electrode active material, the negative electrode plate comprising a negative electrode current collector and a negative electrode membrane arranged on at least one surface of the negative electrode current collector and comprising a negative electrode active material, wherein the positive electrode active material is selected from at least one of a lithium-contained nickel cobalt manganese oxide or a lithium-contained nickel cobalt aluminum oxide, and the negative electrode active material comprises a silicon-based material and a carbon material;

and the secondary battery satisfies: $-4 \leq 2*\sqrt{C}*C_{si}*C_{si}+0.1-L-F \leq 2$, $C \geq 15$ Ah, $25$ cm$\leq L \leq 35$ cm, $3$ N/mm$\leq F \leq 9$ N/mm;

wherein:

C— a rated capacity of the secondary battery, in Ah;

$C_{si}$— a mass proportion of the silicon-based material in the negative electrode active material;

L— a projection length of the outer packaging film, in cm; and

F— a packaging strength of a packaging area of the outer packaging film, in N/mm.

2. The secondary battery according to claim 1, wherein: $-3.5 \leq 2*\sqrt{C}*C_{si}*C_{si}+0.1-L-F \leq 0$.

3. The secondary battery according to claim 1, wherein: $50$ Ah$\leq C \leq 80$ Ah.

4. The secondary battery according to claim 1, wherein: $28$ cm$\leq L \leq 32$ cm.

5. The secondary battery according to claim 1, wherein: $3$ N/mm$\leq F \leq 8$ N/mm.

6. The secondary battery according to claim 1, wherein: the mass proportion of the silicon-based material in the negative electrode active material satisfies $C_{si} \leq 40\%$.

7. The secondary battery according to claim 1, wherein: a thickness T of the packaging area of the outer packaging film is $0.2$ mm$\leq T \leq 0.4$ mm.

8. The secondary battery according to claim 1, wherein: a projection width W of the outer packaging film is $8.5$ cm$\leq W \leq 11$ cm.

9. The secondary battery according to claim 1, wherein: the positive electrode active material is selected from one or more of $Li_aNi_bCo_cM_dM'_eO_fA_g$ or $Li_aNi_bCo_cM_dM'_eO_fA_g$ with at least part of the surface provided with a coating layer, wherein, $0.8 \leq a \leq 1.2$, $0.5 \leq b < 1$, $0 < c < 1$, $0 < d < 1$, $0 \leq e \leq 0.1$, $1 \leq f \leq 2$, $0 \leq g \leq 1$, M is selected from one or more of Mn and Al, M' is selected from one or more of Zr, Al, Zn, Cu, Cr, Mg, Fe, V, Ti and B, and A is selected from one or more of N, F, S and Cl.

10. The secondary battery according to claim 1, wherein: at least part of the positive electrode active material comprises single crystal particles.

11. The secondary battery according to claim 1, wherein: the silicon-based material is selected from one or more of elemental silicon, a silicon-oxygen compound, a silicon-carbon composite, a silicon-nitrogen compound and a silicon alloy.

12. The secondary battery according to claim 1, wherein: the carbon material comprises one or more of graphite, soft carbon and hard carbon.

13. The secondary battery according to claim 1, wherein: the silicon-based material is selected from one or more of elemental silicon, a silicon-oxygen compound, a silicon-carbon composite, a silicon-nitrogen compound and a silicon alloy;

and, the carbon material comprises one or more of graphite, soft carbon and hard carbon.

14. The secondary battery according to claim 1, wherein: a volume average particle diameter $D_{c50}$ of the positive electrode active material is from $8$ μm to $15$ μm.

15. The secondary battery according to claim 1, wherein: a volume average particle diameter $D_{a50}$ of the negative electrode active material is from 11 μm to 18 μm.

16. The secondary battery according to claim 1, wherein: a volume average particle diameter $D_{c50}$ of the positive electrode active material is from 8 μm to 15 μm;

and, a volume average particle diameter $D_{a50}$ of the negative electrode active material is from 11 μm to 18 μm.

17. An apparatus, comprising:

a secondary battery, comprising an outer packaging film and an electrode assembly and an electrolyte accommodated in the outer packaging film, the electrode assembly comprising a positive electrode plate, a negative electrode plate and a separator, the positive electrode plate comprising a positive electrode current collector and a positive electrode membrane arranged on at least one surface of the positive electrode current collector and comprising a positive electrode active material, the negative electrode plate comprising a negative electrode current collector and a negative electrode membrane arranged on at least one surface of the negative electrode current collector and comprising a negative electrode active material, wherein the positive electrode active material is selected from at least one of a lithium-contained nickel cobalt manganese oxide or a lithium-contained nickel cobalt aluminum oxide, and the negative electrode active material comprises a silicon-based material and a carbon material;

and the secondary battery satisfies: $-4 \leq 2*\sqrt{C}*C_{si}*C_{si}+0.1-L-F \leq 2$, $C \geq 15$ Ah, 25 cm$\leq L \leq$35 cm, 3 N/mm$\leq F \leq$9 N/mm;

wherein:

C— a rated capacity of the secondary battery, in Ah;

$C_{si}$— a mass proportion of the silicon-based material in the negative electrode active material;

L—a projection length of the outer packaging film, in cm; and

F— a packaging strength of a packaging area of the outer packaging film, in N/mm.

* * * * *